(12) United States Patent
Kim

(10) Patent No.: US 8,212,961 B2
(45) Date of Patent: Jul. 3, 2012

(54) BACKLIGHT FOR LIQUID CRYSTAL DISPLAY DEVICE HAVING A FIRST FPCB MOUNTING A PLURALITY OF LIGHT EMITTING DIODES CONNECTING A SECOND FPCB VIA A THROUGH HOLE FORMED ON A LOWER COVER

(75) Inventor: Byoung Chul Kim, Gyuongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 629 days.

(21) Appl. No.: 12/003,764

(22) Filed: Dec. 31, 2007

(65) Prior Publication Data
US 2009/0002595 A1 Jan. 1, 2009

(30) Foreign Application Priority Data
Jun. 28, 2007 (KR) .................. 10-2007-0064069

(51) Int. Cl.
G02F 1/1333 (2006.01)
G02F 1/1335 (2006.01)
A47F 3/00 (2006.01)
G09F 13/04 (2006.01)

(52) U.S. Cl. ............... 349/61; 349/58; 349/64; 349/65; 362/97.2; 362/561

(58) Field of Classification Search .............. 349/61, 349/58, 64–65; 362/97.2, 561
See application file for complete search history.

(56) References Cited

U.S. PATENT DOCUMENTS

| | | | |
|---|---|---|---|
| 5,593,307 A | 1/1997 | Bale et al. | |
| 2006/0221268 A1* | 10/2006 | Ko et al. | 349/58 |
| 2007/0236626 A1* | 10/2007 | Koganezawa | 349/61 |

FOREIGN PATENT DOCUMENTS

| | | |
|---|---|---|
| CN | 2751326 Y | 1/2006 |
| CN | 1743919 A | 3/2006 |
| CN | 1743919 * | 9/2009 |

* cited by examiner

*Primary Examiner* — Lauren Nguyen
(74) *Attorney, Agent, or Firm* — Morgan, Lewis & Bockius LLP

(57) ABSTRACT

A first printed circuit board is disposed on a first side of the cover. A second printed circuit board is disposed on a second side of the cover. A first connector and a second connector are disposed on the first and second printed circuit boards, respectively. A through hole is formed in a region of the cover that corresponds to the first connector. The first and second connectors are electrically connected to each other through the through hole.

5 Claims, 3 Drawing Sheets

BACKLIGHT FOR LIQUID CRYSTAL DISPLAY DEVICE HAVING A FIRST FPCB MOUNTING A PLURALITY OF LIGHT EMITTING DIODES CONNECTING A SECOND FPCB VIA A THROUGH HOLE FORMED ON A LOWER COVER

BACKGROUND

The present disclosure relates to a liquid crystal display (LCD) device.

As information-oriented society emerges, a flat display device for displaying information is widely used. The flat display devices include LCD device, plasma display panel (PDP), and organic electro-luminescent display device.

Among the flat display device, since the LCD device has characteristics of a lightweight and slim profile, low power consumption, and driving of full color moving images, the LCD device is most widely used. Currently, the LCD device is applied to cellular phones, navigations, portable multimedia players (PMPs), portable monitors, and televisions (TVs).

Since the LCD device is a light-receiving type device not spontaneously generating light, it indispensably requires a backlight unit for generating a light.

A light source of the backlight unit includes electro luminescence (EL), a light emitting diode (LED), a cold cathode fluorescent lamp (CCFL), a hot cathode fluorescent lamp (HCFL), and an external electrode fluorescent Lamp (EEFL). Recently, a light emitting diode (LED) backlight unit having long life and easily miniaturized is developed, and applied from a small-sized display device to a large-sized display device.

FIG. 1 is a cross-sectional view of an LCD device having a related art LED backlight unit.

Referring to FIG. 1, the LCD device 10 includes an LC display panel 5 and a backlight unit. The backlight unit includes a first printed circuit board (PCB) 11 in which a plurality of light emitting diodes (LEDs) 15 for generating light are mounted, and optical sheets 7 on the PCB 11 including the LEDs 15, for controlling diffusion and condensation of light.

The PCB 11 and the optical sheets 7 are received inside a lower cover 9. A second PCB 8 for driving the LEDs 15 is disposed on the rear side of the lower cover 9. A first connector 12 and a second connector 16 are disposed on the first PCB 11 and the second PCB 8, respectively. The first and second connectors 12 and 16 are electrically connected to each other using a wire 17. The wire 17 is connected to the second connector 16 disposed on the second PCB 8, extends from the rear side of the lower cover 9, passes through a lateral side of the lower cover 9, and is connected to the first connector 12 of the first PCB 11 disposed inside the lower cover 9.

As described above, according to the related art LCD device, the wire 17 should be assembled such that the wire 17 extends from the rear side of the lower cover 9, passes through the lateral side of the lower cover 9, and is connected to the first connector 12 of the first PCB 11, an assembly process is complicated and not easy.

Also, since the wire 17 is exposed, the wire 17 may be detached from the first connector 12 of the first PCB 11 during a subsequent process, so that the wire 17 is not easy to manage.

SUMMARY

Accordingly, the present invention is directed to a liquid crystal display device that substantially obviates one or more of the problems due to limitations and disadvantages of the related art.

Embodiments provide a liquid crystal display device that can be easily assembled.

Embodiments also provide a liquid crystal display device that can reduce manufacturing costs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one embodiment, a liquid crystal display device includes: a cover having a through hole; a first printed circuit board on a first side of the cover, the first printed circuit board mounting a plurality of light emitting diode chips thereon, and disposing a first connecting means on one side thereof; and a second printed circuit board on a second side of the cover, the second printed circuit board generating driving signals for driving the light emitting diode chips, and disposing a second connecting means on one side thereof, the through hole being on a position corresponding to the first connecting means, and the first connecting means and second connecting means being electrically connected to each other through the through hole.

In another embodiment, a liquid crystal display device includes: a cover having a through hole; a first printed circuit board on a first side of the cover, the first printed circuit board mounting a plurality of light emitting diode chips thereon, and disposing a first connector on one side thereof; and a second printed circuit board on a second side of the cover, the second printed circuit board generating driving signals for driving the light emitting diode chips, and disposing a second connector on one side thereof, the through hole being on a position corresponding to the first connector, and the first and second connectors being electrically connected to each other through the through hole.

In further another embodiment, a liquid crystal display device includes: a cover having a through hole; a first printed circuit board on a first side of the cover, the first printed circuit board mounting a plurality of light emitting diode chips thereon, and disposing a contact pattern on one side thereof; and a second printed circuit board on a second side of the cover, the second printed circuit board generating driving signals for driving the light emitting diode chips, and disposing a connector on one side thereof, the through hole being on a position corresponding to the connector, and the connector and the contact pattern being electrically connected to each other through the through hole.

In still further another embodiment, a liquid crystal display device includes: a cover having a through hole; a first printed circuit board on a first side of the cover, the first printed circuit board mounting a plurality of light emitting diode chips thereon, and disposing a connector on one side thereof; and a second printed circuit board on a second side of the cover, the second printed circuit board generating driving signals for driving the light emitting diode chips, and disposing a contact pattern on one side thereof, the through hole being on a position corresponding to the connector, and the connector and the contact pattern being electrically connected to each other through the through hole.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention, in which.

DETAILED DESCRIPTION OF THE EMBODIMENTS

Reference will now be made in detail to the embodiments of the present disclosure, examples of which are illustrated in the accompanying drawings.

Figure 2:
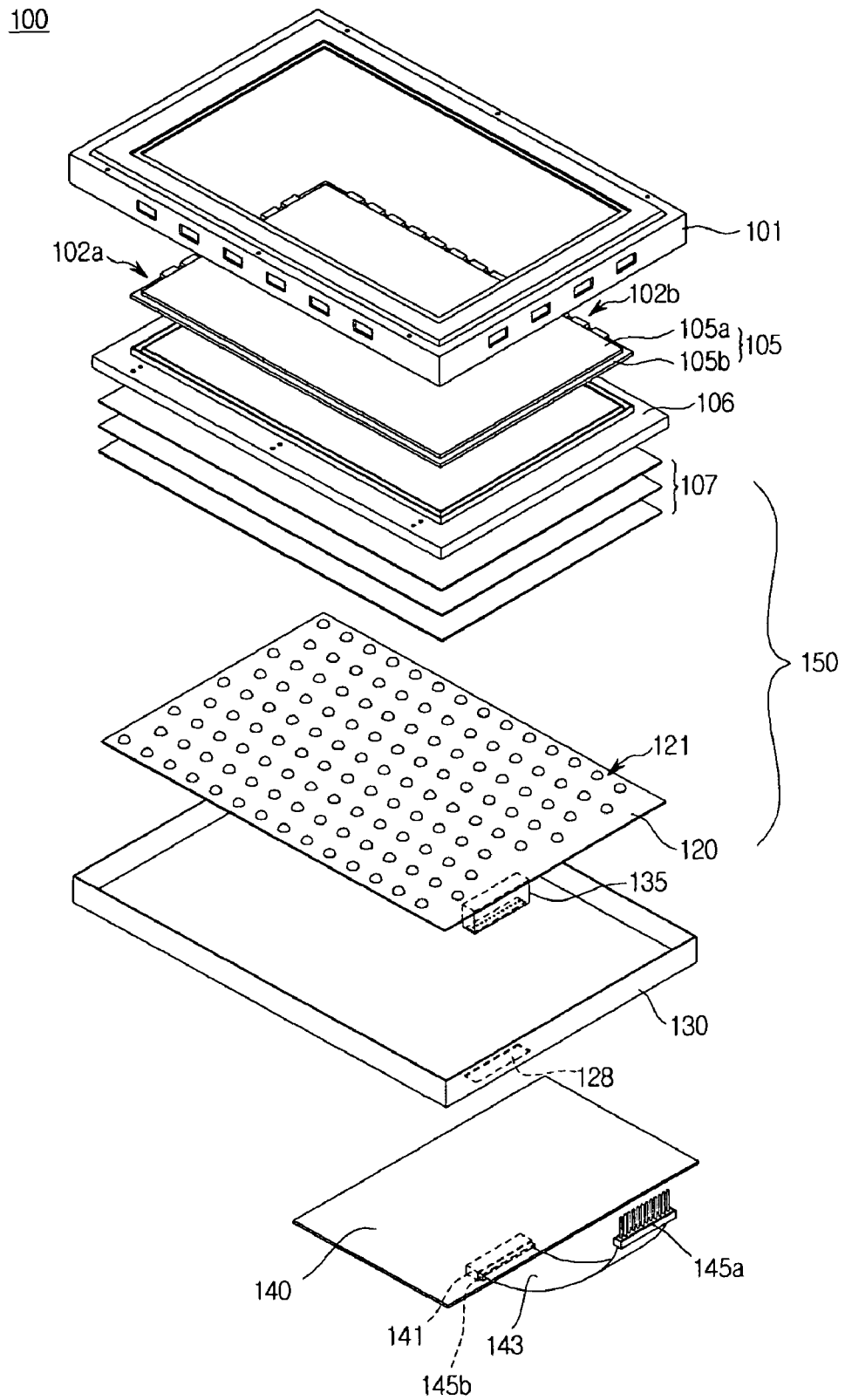
FIG. 2 is an exploded perspective view of an LCD device according to an embodiment.

FIG. 2 is an exploded perspective view of an LCD device according to an embodiment.

Referring to FIG. 2, the LCD device 100 includes an LC display panel 105 for displaying an image, a backlight unit 150 disposed on the rear side of the LC display panel 105 to provide light, a mold frame 106 for supporting the LC display panel 105, a lower cover 130 for receiving the mold frame 106 and the backlight unit 150, and an upper cover 101 coupled to the lower cover 130.

The LC display panel 105 includes a color filter substrate 105a having a color filter layer including red color filters, green color filters, and blue color filters, and a thin film transistor (TFT) substrate 105b having a TFT and a pixel electrode on each pixel region. The color filter substrate 105a and the TFT substrate 105b are attached to each other with an LC layer (not shown) interposed therebetween. A gate driver 102a and a data driver 102b are disposed on at least one lateral portion of the LC display panel 105 to supply a gate drive signal and a data drive signal, respectively. Though not shown, a first polarizer and a second polarizer for polarizing light can be disposed on the outer surfaces of the color filter substrate 105a and the TFT substrate 105b, respectively.

The backlight unit 150 includes a first PCB 120 on which a plurality of LED chips 121 including red, green, and blue LEDs or white LEDs are mounted, and optical sheets 107 disposed on the first PCB 120 to control diffusion and condensation of light. Though not shown, a reflection coating layer or a reflection sheet for reflecting light can be disposed on the first PCB 120.

The backlight unit 150 can be received inside the lower cover 130. The mold frame 106 can support the LC display panel 105, and be received inside the lower cover 130.

A second PCB 140 for driving the LED chips 121 of the first PCB 120 is disposed on the rear side of the lower cover 130. The second PCB 140 can be included as a portion of the backlight unit 150.

A plurality of conductive patterns (not shown) that can be electrically connected with the LED chips 121 can be formed on the first PCB 120. Respective conductive pattern can be integrally formed along one direction of the first PCB 120. An insulating layer can be formed on the conductive patterns to protect the conductive patterns. Therefore, the LED chips can be electrically connected to the conductive patterns by opening the insulating layer and using soldering.

A first connector 135 that is electrically connected to the conductive patterns is disposed on a portion on one side of the first PCB 120. The first connector 135 can be disposed in a lower direction of the first PCB 120. The first connector 135 includes a plurality of first concave pins corresponding to the conductive patterns. Therefore, as the first connector 135 is disposed in the lower direction, the first concave pins of the first connector 135 can be also disposed in the lower direction of the first connector 135.

The lower cover 130 includes a through hole 128 formed in a region corresponding to the first connector 135. Accordingly, the first connector 135 can be exposed or protrude to the outside of the lower cover 130 through the through hole 128.

A second connector 141 is disposed on the rear side of the second PCB 140. The second connector 141 includes a plurality of second concave pins corresponding to the first concave pins of the first connector 135. The second concave pins can be formed in a lateral direction of the second connector 141.

A power cable 143 can be provided to electrically connect the first connector 135 with the second connector 141. A first connection terminal 145a and a second connection terminal 145b can be provided to both ends of the power cable 143, respectively. A plurality of first convex pins and second convex pins are formed at the first and second connection terminals 145a and 145b, respectively.

Therefore, a driving signal generated by the second PCB 140 passes through the second connector 141, the second connection terminal 145b, the power cable 143, the first connection terminal 145a, the first connector 135, and the first PCB 120, and is supplied to the LED chips 121. The LED chips 121 emit light in response to the driving signal, and the emitted light is illuminated onto the LC display panel 105. The light transmittance of the light is controlled by driving of the LC display panel 105, so that an image is displayed.

Figure 1:
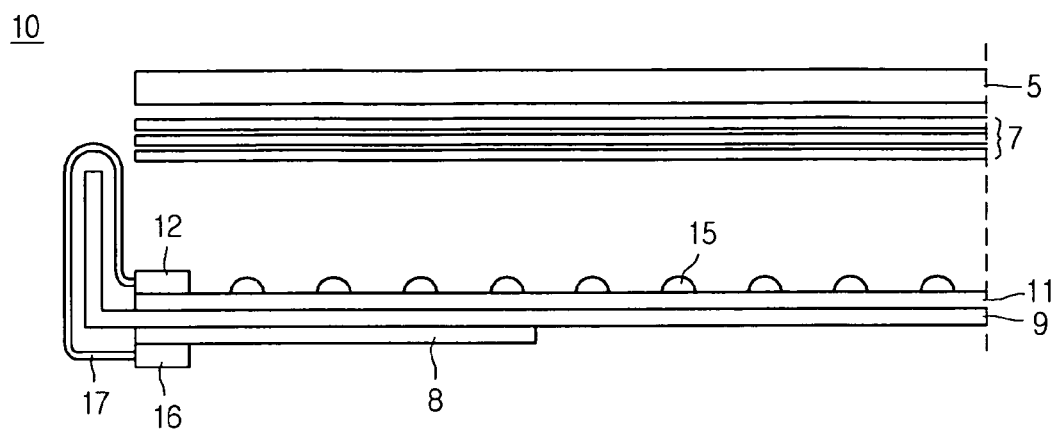
FIG. 1 is a cross-sectional view of an LCD device having a related art LED backlight unit.

Since a wire should be disposed along the rear side and the lateral sides of the lower cover to electrically connect the first PCB with the second PCB according to a related art, there has been a limitation in an assembling process and wire management (refer to FIG. 1).

According to an embodiment, the through hole 128 is formed in a portion of the lower cover 130 that corresponds to the first connector 135 disposed on the first PCB 120, and the first and second connection terminals 145a and 145b provided at both ends of the power cable 143 can electrically connect the second connector 141 of the second PCB 140 with the first connector 135 of the first PCB 120 through the through hole 128 of the lower cover 130. Accordingly, since the power cable 143 can be easily connected, the power cable 143 can be easily assembled. Also, since the length of the power cable 143 remarkably reduces compared to the related art, the power cable 143 is easily managed. Since the power cable 143 is almost not exposed, detachment of the power cable 143 from the first and second connectors 135 and 141 does not occur during a subsequent process, so that generation of a defective product can be prevented.

Though only one first connector 135 is disposed in the drawing, a plurality of first connectors can be disposed depending on the size or the driving method of the first PCB 120. A plurality of through holes can be also formed in the lower cover 130 to correspond to the plurality of first connectors. Likewise, a plurality of second connectors 141 can be formed.

Therefore, an assembly process of the LCD device according to an embodiment is simplified, and the LCD device can have a lightweight and slim profile assembly structure. Also, the power cable 143 of the LCD device according to an embodiment is much shortened, so that management is easy and generation of a defective product is prevented.

Figure 3:
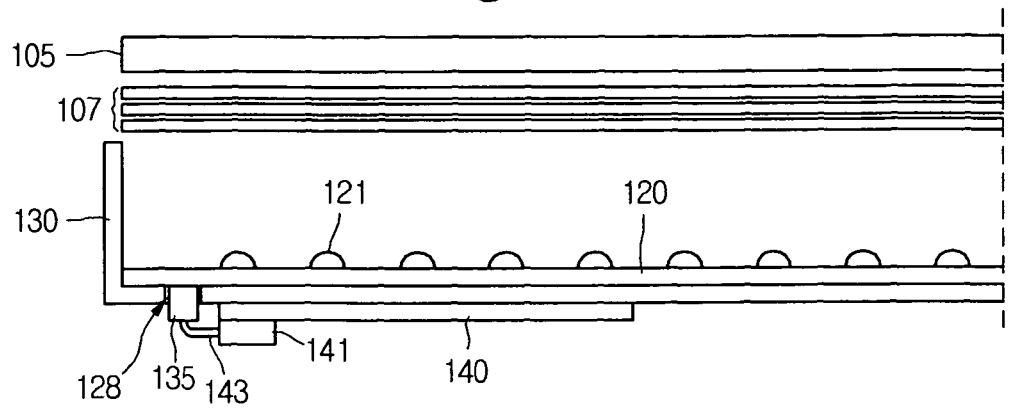
FIG. 3 is a schematic view of an assembly structure of an LCD device according to a first embodiment.

FIG. 3 is a schematic view of an assembly structure of an LCD device according to a first embodiment.

Referring to FIGS. 2 and 3, the first PCB 120 including the LED chips 121 is disposed inside the lower cover 130, and the second PCB 140 for driving the LED chips 121 is disposed on the rear side of the lower cover 130. The optical sheets 107 are disposed on the first PCB 120 including the LEDs 121, and the LC display panel 105 is disposed on the optical sheets 107. The optical sheets 107 are received in the lower cover 130, and the LC display panel 105 is supported by the mold frame 106.

The first connector 135 is disposed in a lower direction perpendicular to the lower cover 130 on one side portion of the rear side of the first PCB 120. The through hole 128 is formed in a portion of the lower cover 130 that corresponds to the first connector 135. Therefore, the first connector 135 of the first PCB 120 is exposed or protrudes to the outside of the lower cover 130 through the through hole 128 of the lower cover 130. The second connector 141 of the second PCB 140 can be disposed on the second PCB 140 on the rear side of the lower cover 130 so that the second connector 141 is adjacent to the first connector 135 protruding to the outside of the lower cover 130 through the through hole 128 of the lower cover 130. The first concave pins of the first connector 135 are formed in a lower direction perpendicular to the lower cover 130, and the second concave pins of the second connector 141 can be formed in a direction parallel to the lower cover 130.

The first connector 135 protruding through the through hole 128 of the lower cover 130, and the second connector 141 provided to the second PCB 140 disposed on the rear side of the lower cover 130 can be electrically connected to each other using the power cable 143. That is, the first and second connection terminals 145a and 145b are provided to both ends of the power cable 143. The first and second connection terminals 145a and 145b include the first and second convex pins, respectively. The first connection terminal 145a is electrically connected to the first connector 135, and the second connection terminal 145b is electrically connected to the second connector 141.

Therefore, since the first connector 135 and the second connector 141 are disposed adjacent to each other, the length of the power cable 143 can be minimized. Accordingly, management limitation or a defective product associated with the power cable can be prevented. Also, the first and second connection terminals 145a and 145b provided to both ends of the power cable 143 are directly coupled to the first connector 135 exposed through the through hole 128 of the lower cover 130 and the second connector 141 disposed on the second PCB 140 on the rear side of the lower cover 130, respectively, so that an assembly process is easy and simple.

Figure 4:
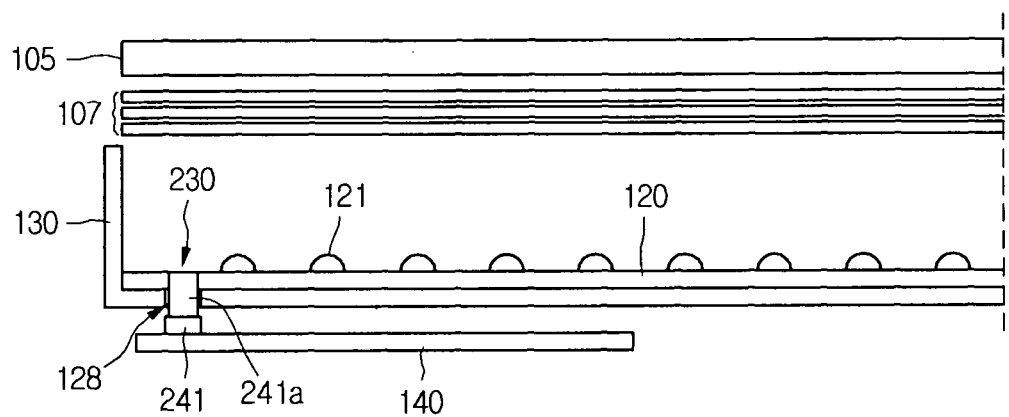
FIG. 4 is a schematic view of an assembly structure of an LCD device according to a second embodiment.

FIG. 4 is a schematic view of an assembly structure of an LCD device according to a second embodiment.

Referring to FIGS. 2 and 4, a first PCB 120 including LED chips 121 is disposed inside a lower cover 130, and a second PCB 140 for driving the LED chips 121 is disposed on the rear side of the lower cover 130. Optical sheets 107 are disposed on the first PCB 120 including the LEDs 121, and an LC display panel 105 is disposed on the optical sheets 107. The optical sheets 107 are received in the lower cover 130, and the LC display panel 105 is supported by a mold frame 106.

A connector 241 is disposed in an upper direction perpendicular to the lower cover 130 on one side portion of the second PCB 140. The connector 241 includes a plurality of convex pins 241a disposed in an upper direction of the lower cover 130.

The lower cover 130 includes a through hole 128 formed in a region corresponding to the connector 241. Therefore, the connector 241 can be inserted into the lower cover 130 through the through hole 128. Also, the connector 241 may be located outside the lower cover 130, and only the convex pins 241a of the connector 241 may be inserted into the lower cover 130 through the through hole 128.

The first PCB 120 includes a contact pattern 230 formed in a region corresponding to the connector 241 and the through hole 128 of the lower cover 130. The contact pattern 230 can be formed by the number corresponding to the convex pins 241a of the connector 241. The contact pattern 230 includes a hole formed in the first PCB 120 and a conductive layer formed on the inner surface of and around the hole. The conductive layer is electrically connected to a conductive pattern disposed on the first PCB 120.

When the connector 241 disposed on the second PCB 140 is inserted through the through hole 128 of the lower cover 130, the convex pins 241a of the connector 241 are electrically connected to the contact pattern 230, specifically, the conductive layer.

A driving signal generated by the second PCB 140 is supplied to the conductive layer of the contact pattern 230 formed on the first PCB 120 through the convex pins 241a of the connector 241, and subsequently, to the LED chips 121 through the conductive pattern of the first PCB 120 electrically connected to the conductive layer. The LED chips 121 emit light in response to the driving signal.

Therefore, since the connector 241 disposed on the second PCB 140 is directly connected electrically to the contact pattern 230 of the first PCB 120 through the through hole 128 of the lower cover 130, a power cable for electrically connecting the first PCB 120 with the second PCB 140 is not required, so that manufacturing costs can be reduced. Also, since the power cable is not required, there is no difficulty in managing the power cable and generation of a defective product can be prevented.

A plurality of contact patterns can be provided to correspond to the convex pins 241a of the connector 241. A plurality of through holes can be formed in the lower cover 130 to correspond to the plurality of contact patterns.

Figure 5:
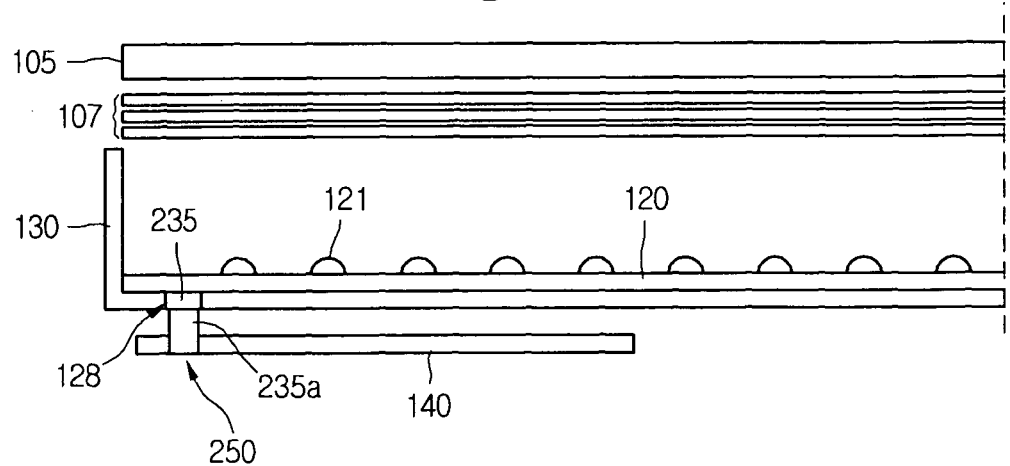
FIG. 5 is a schematic view of an assembly structure of an LCD device according to a third embodiment.

FIG. 5 is a schematic view of an assembly structure of an LCD device according to a third embodiment.

Referring to FIGS. 2 and 5, a first PCB 120 including LED chips 121 is disposed inside a lower cover 130, and a second PCB 140 for driving the LED chips 121 is disposed on the rear side of the lower cover 130. Optical sheets 107 are disposed on the first PCB 120 including the LEDs 121, and an LC display panel 105 is disposed on the optical sheets 107. The optical sheets 107 are received in the lower cover 130, and the LC display panel 105 is supported by a mold frame 106.

A connector 235 is disposed in a lower direction perpendicular to the lower cover 130 on one side portion of the first PCB 120. The connector 235 includes a plurality of convex pins 235a disposed in a lower direction of the lower cover 130.

The lower cover 130 includes a through hole 128 formed in a region corresponding to the connector 235. Therefore, the connector 235 can protrude to the outside of the lower cover 130 through the through hole 128. Also, the connector 235 may be located outside the lower cover 130, and only the convex pins 235a of the connector 235 may be exposed or protrude to the outside of the lower cover 130 through the through hole 128.

The second PCB 140 includes a contact pattern 250 formed in a region corresponding to the connector 235 and the through hole 128 of the lower cover 130. The contact pattern 250 can be formed by the number corresponding to the convex pins 235a of the connector 235. The contact pattern 250 includes a hole formed in the second PCB 140 and a conductive layer formed on the inner surface of and around the hole. The conductive layer is electrically connected to a conductive pattern disposed on the second PCB 140.

When the connector 235 disposed on the first PCB 120 is inserted through the through hole 128 of the lower cover 130, the convex pins 235a of the connector 235 are electrically connected to the contact pattern 250, specifically, the conductive layer.

A driving signal generated by the second PCB 140 is supplied to the convex pins 235a of the connector 235 through the conductive layer of the contact pattern 250, and subsequently, the driving signal supplied to the convex pins 241a of the connector 235 is supplied to the LED chips 121 through the conductive pattern of the first PCB 120. The LED chips 121 emit light in response to the driving signal.

Therefore, since the connector 235 disposed on the first PCB 120 is directly connected electrically to the contact pattern 250 of the second PCB 140 through the through hole 128 of the lower cover 130, a power cable for electrically connecting the first PCB 120 with the second PCB 140 is not required, so that manufacturing costs can be reduced. Also, since the power cable is not required, there is no difficulty in managing the power cable and generation of a defective product can be prevented.

A plurality of contact patterns can be provided to correspond to the convex pins 241a of the connector 241. A plurality of through holes can be formed in the lower cover 130 to correspond to the plurality of contact patterns.

As described above, a first PCB including LED chips can be directly connected electrically with a second PCB for generating a driving signal when a backlight unit of an LCD device is assembly, so that an assembly process is easy and manufacturing costs can be reduced.

Also, according to an embodiment, since a power cable for electrically connecting a first PCB and a second PCB is not required, an assembly process is easy and manufacturing costs can be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device, comprising:
a liquid crystal (LC) display panel;
a mold frame supporting the LC display panel;
a cover receiving the mold frame and the LC display panel, and the cover having a through hole;
a first printed circuit board being received an inside of the cover and contacting with the inside of the cover, the first printed circuit board mounting a plurality of light emitting diode chips thereon, and disposing a first connecting means on one side thereof; and
a second printed circuit board on a rear side of the cover, the second printed circuit board generating driving signals for driving the light emitting diode chips, and disposing a second connecting means on one side thereof,
wherein the through hole is on a position corresponding to the first connecting means,
wherein the first connecting means and the second connecting means are electrically connected to each other through the through hole,
wherein a whole lower surface of the first printed circuit board directly contacts the inside of the cover,
wherein a whole upper surface of the second printed circuit board is directly contacted with the outside of the cover,
wherein the first connecting means comprises a first connector disposed on the first printed circuit board,
wherein the second connecting means comprises a second connector disposed on the second printed circuit board, and
wherein the first connector and the second connector are electrically connected to each other using a power cable.

2. The liquid crystal display device according to claim 1, wherein the power cable comprises a first connection terminal and a second connection terminal for electrically connecting with the first and second connectors, respectively.

3. The liquid crystal display device according to claim 1, wherein the first connector is disposed on the first printed circuit board in a lower direction of the first printed circuit board such that the first connector is protruded to an outside of the cover through the through hole of the cover.

4. The liquid crystal display device according to claim 1, wherein at least one first connector, at least one through hole, and at least one second connector are formed.

5. The liquid crystal display device according to claim 1, further comprising:
optical sheets on the first printed circuit board; and
a liquid crystal display panel on the optical sheets.

* * * * *